US012705985B2

(12) United States Patent
Fontes et al.

(10) Patent No.: US 12,705,985 B2
(45) Date of Patent: Aug. 11, 2026

(54) METHOD AND SYSTEM OF PILOT DATA ENTRY FOR AUDIO MESSAGE PARAMETERS ON AN AIRCRAFT

(71) Applicant: HONEYWELL INTERNATIONAL INC., Charlotte, NC (US)

(72) Inventors: Brendan Fontes, Phoenix, AZ (US); Steven Crouch, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 105 days.

(21) Appl. No.: 18/931,538

(22) Filed: Oct. 30, 2024

(65) Prior Publication Data

US 2026/0120576 A1 Apr. 30, 2026

(51) Int. Cl.

| | |
|---|---|
| ***G08G 5/21*** | (2025.01) |
| ***B64D 45/00*** | (2006.01) |
| ***G01C 23/00*** | (2006.01) |
| ***G08G 5/26*** | (2025.01) |
| ***G10L 15/22*** | (2006.01) |
| ***G10L 15/26*** | (2006.01) |

(52) U.S. Cl.

CPC ............... *G08G 5/21* (2025.01); *B64D 45/00* (2013.01); *G01C 23/005* (2013.01); *G08G 5/26* (2025.01); *G10L 15/22* (2013.01); *G10L 15/26* (2013.01)

(58) Field of Classification Search

None

See application file for complete search history.

(56) References Cited

U.S. PATENT DOCUMENTS

| | | | | |
|---|---|---|---|---|
| 8,364,328 | B2 | 1/2013 | Hedrick | |
| 9,810,770 | B1 | 11/2017 | Weichbrod et al. | |
| 10,157,617 | B2 * | 12/2018 | Shamasundar | G10L 15/26 |
| 11,967,306 | B2 | 4/2024 | Saptharishi et al. | |
| 11,978,346 | B2 | 5/2024 | Shapiro et al. | |
| 12,488,692 | B2 * | 12/2025 | Sampath | G08G 5/723 |
| 2023/0215279 | A1 | 7/2023 | Sampath et al. | |
| 2023/0368682 | A1 | 11/2023 | Baladhandapani et al. | |
| 2024/0339039 | A1 * | 10/2024 | Arteaga | H04L 51/02 |

FOREIGN PATENT DOCUMENTS

| | | | | |
|---|---|---|---|---|
| EP | 3124384 | A1 | 2/2017 | |
| EP | 4152294 | A1 * | 3/2023 | G08G 5/26 |
| KR | 102504508 | B1 | 3/2023 | |

* cited by examiner

*Primary Examiner* — Abdhesh K Jha

(74) *Attorney, Agent, or Firm* — Ingrassia Fisher & Lorenz

(57) ABSTRACT

A method includes receiving at least one audio message providing instructions to a user to operate an aircraft, and displaying an avionics data entry page on a display device and having multiple data parameter fields to receive one or more avionics parameters of different types from the message. The multiple data parameter fields are arranged in a data entry layout that mimics a parameter display layout of an avionics display so that an individual data parameter field at a mimicked location on the avionics data entry page has a related parameter display position on the avionics display. The method also includes receiving confirmation from the user that at least one of the avionics parameters on the avionics data entry page is correct.

20 Claims, 8 Drawing Sheets

FIG. 2

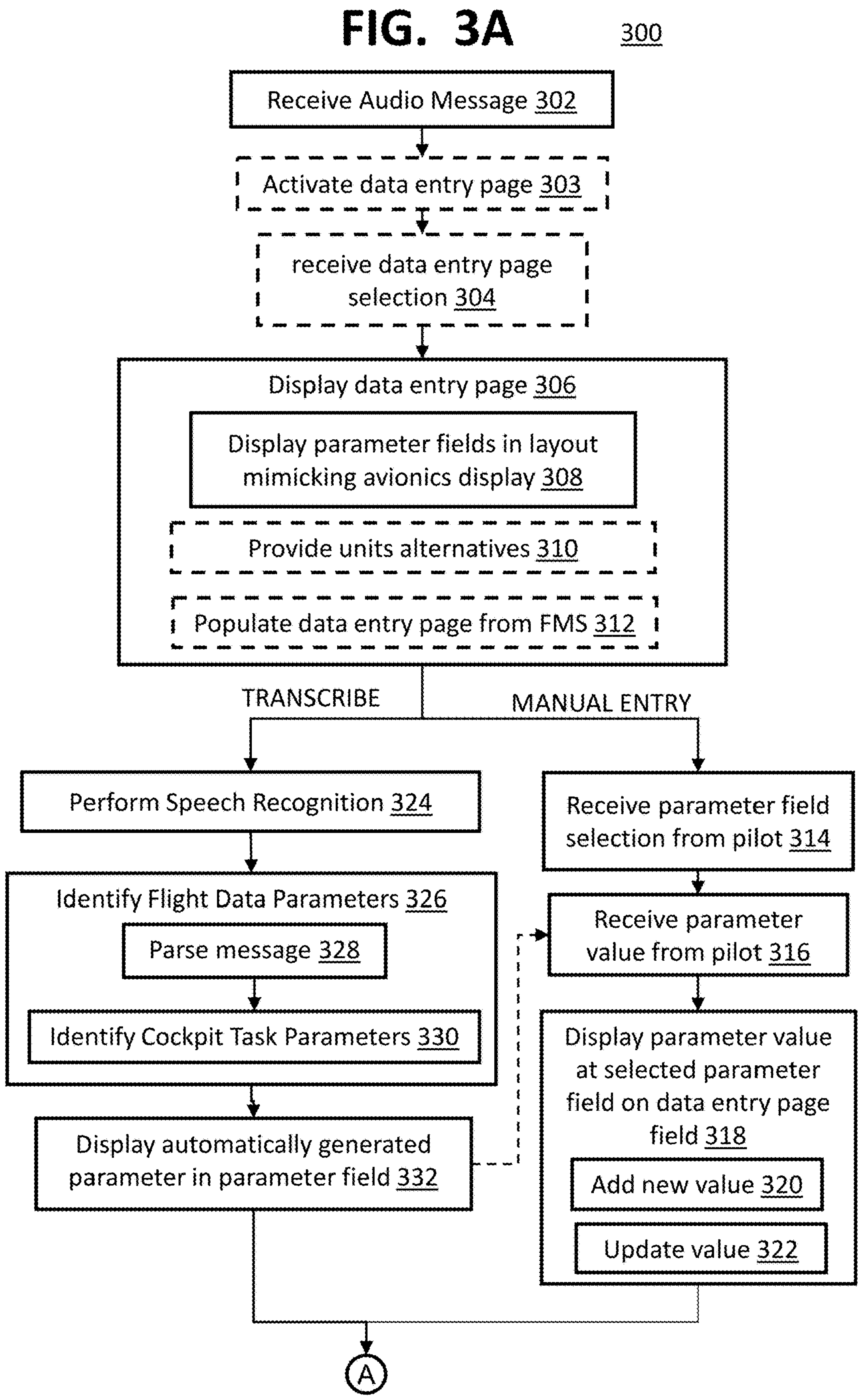
FIG. 3A
300
Receive Audio Message 302
Activate data entry page 303
receive data entry page selection 304
Display data entry page 306
Display parameter fields in layout mimicking avionics display 308
Provide units alternatives 310
Populate data entry page from FMS 312
TRANSCRIBE
MANUAL ENTRY
Perform Speech Recognition 324
Identify Flight Data Parameters 326
Parse message 328
Identify Cockpit Task Parameters 330
Display automatically generated parameter in parameter field 332
Receive parameter field selection from pilot 314
Receive parameter value from pilot 316
Display parameter value at selected parameter field on data entry page field 318
Add new value 320
Update value 322
A

FIG. 7

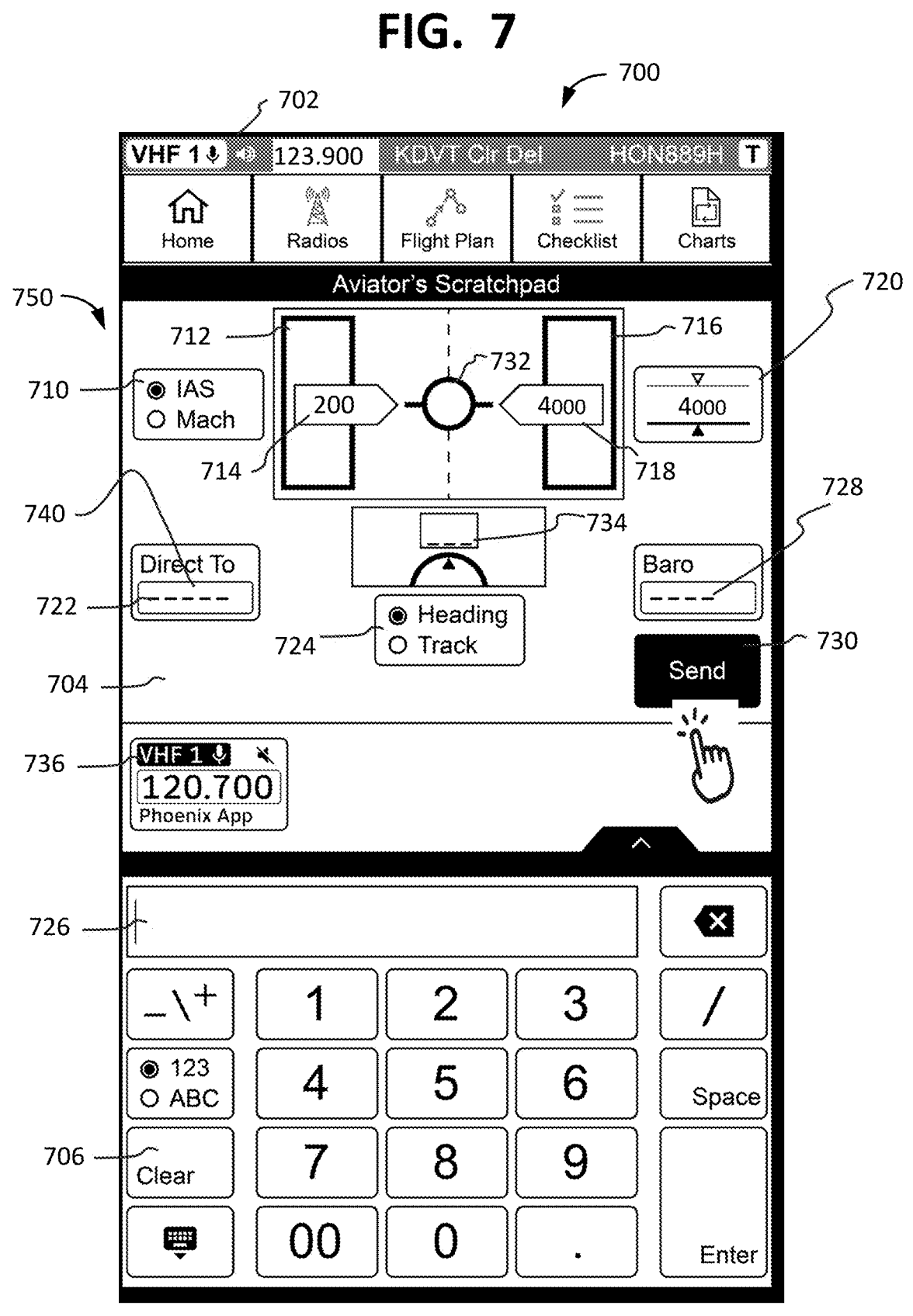

700
702
VHF 1 123.900 KDVT Clr Del HON889H T
Home
Radios
Flight Plan
Checklist
Charts
Aviator's Scratchpad
750
712
716
720
710
IAS
Mach
732
200
4000
4000
714
718
728
740
734
Direct To
Baro
722
Heading
Track
724
730
Send
704
736
VHF 1
120.700
Phoenix App
726
_\+
1
2
3
/
123
ABC
4
5
6
Space
706
Clear
7
8
9
00
0
.
Enter

METHOD AND SYSTEM OF PILOT DATA ENTRY FOR AUDIO MESSAGE PARAMETERS ON AN AIRCRAFT

TECHNICAL FIELD

The subject matter described herein generally relates to vehicle systems, and more particularly, to audio messages received on the vehicles.

BACKGROUND

Modern flight deck displays (or cockpit displays) provide several different displays from which a pilot or other user can obtain information or perform functions related to, for example, flight planning, flight guidance, navigation, and performance management. Modern displays also allow a pilot to input commands or other information to onboard systems, such as navigational clearances or commands issued by an air traffic controller (ATC). For example, air traffic control involves voice communication between air traffic control and a pilot or crewmember onboard the various aircraft, where the ATC may communicate an instruction or a request for pilot action by a particular aircraft using a call sign assigned to that aircraft. The instructions may provide a particular navigation related value, such as altitude, speed, or flight plan location such as a waypoint. However, the entry of the parameters from such audio messages typically involve data entry on multiple displays resulting in a complex process that divides the pilot's attention in multiple directions in a cockpit. Often a pilot writes down the parameters while listening to the audio whether on paper or digital pad for subsequent data entry on the avionics displays. Due to the pilot's attention being directed in multiple directions at once, it is easy for the pilot to forget the meaning of what was written before entering the parameters into an avionics system, or may not be able to read the handwriting. Hence, it is desirable to provide aircraft systems with a single data entry display that is easy to understand and use to enter data from audio messages.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one example implementation, a method includes receiving at least one audio message providing instructions to a user to operate an aircraft, and displaying, by at least one processor, an avionics data entry page on a display device and having multiple data parameter fields to receive one or more avionics parameters of different types from the audio message. The multiple data parameter fields are arranged in a data entry layout that mimics a parameter display layout of an avionics display so that an individual data parameter field at a mimicked location on the avionics data entry page has a related parameter display position on the avionics display. The method also includes receiving, by at least one processor, confirmation from the user that at least one of the avionics parameters on the avionics data entry page is correct.

In another example implementation, a system includes memory, and processor circuitry forming at least one processor communicatively coupled to the memory. The processor is arranged to operate by receiving at least one audio message providing instructions to a user to operate an aircraft, and displaying an avionics data entry page on a display device and having multiple data parameter fields to receive one or more avionics parameters of different types from the audio message. The multiple data parameter fields are arranged in a data entry layout that mimics a parameter display layout of an avionics display so that an individual data parameter field at a mimicked location on the avionics data entry page has a related parameter display position on the avionics display. The processor also operates by receiving confirmation from the user that at least one of the avionics parameters on the avionics data entry page is correct.

In yet another example implementation, a non-transitory computer-readable medium has computer-executable instructions stored thereon that, when executed by a computing device, cause the computing device to operate by receiving at least one audio message providing instructions to a user to operate an aircraft, and displaying an avionics data entry page on a display device and having multiple data parameter fields to receive one or more avionics parameters of different types from the audio message. The multiple data parameter fields are arranged in a data entry layout that mimics a parameter display layout of an avionics display so that an individual data parameter field at a mimicked location on the avionics data entry page has a related parameter display position on the avionics display. Instructions also cause the computing device to operate by receiving confirmation from the user that at least one of the avionics parameters on the avionics data entry page is correct.

Furthermore, other desirable features and characteristics of the system and method for data entry for audio messages on a vehicle as described herein will become apparent from the subsequent detailed description and the appended claims, taken in conjunction with the accompanying drawings and the preceding background.

BRIEF DESCRIPTION OF THE DRAWINGS

Implementations of the subject matter will hereinafter be described in conjunction with the following drawing figures, wherein like numerals denote like elements, and:

FIG. 2 is a schematic diagram of an example data entry page unit of FIG. 1 and according to at least one of the implementations herein;

FIGS. 3A-3B is a flow chart of a method of pilot data entry for audio messages on a vehicle according to at least one of the implementations herein;

FIG. 7 is a schematic diagram of yet another example data entry page shown on a display device according to at least one of the implementations herein;

DETAILED DESCRIPTION

Figure 1:
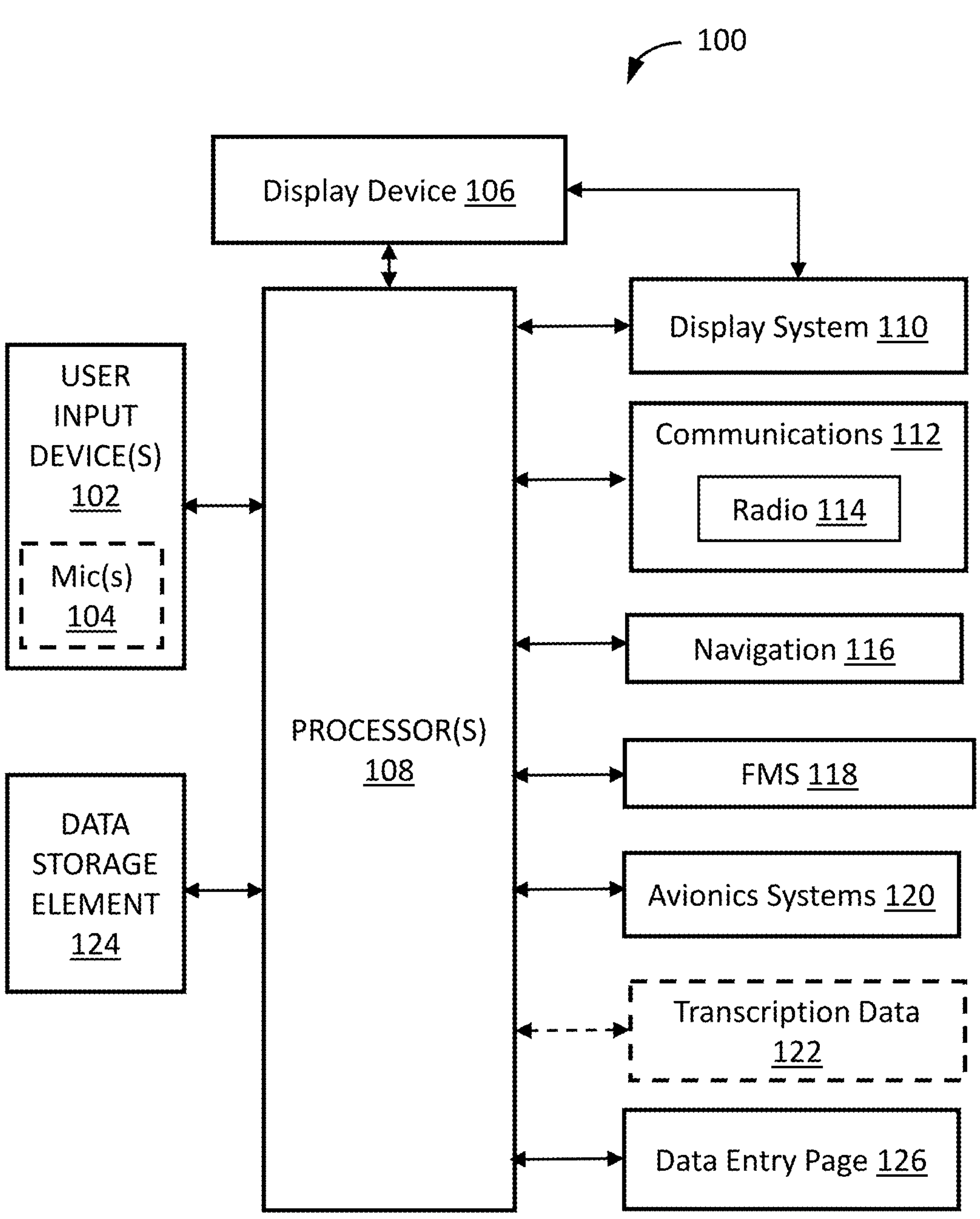
FIG. 1 is a schematic diagram of an example aircraft system according to at least one of the implementations herein.

The following detailed description includes example implementations that are not intended to limit the subject matter of the application and uses thereof. Furthermore, there is no intention to be bound by any theory presented in the preceding background, brief summary, or the following detailed description.

Implementations of the subject matter described herein generally relate to systems and methods that facilitate a vehicle operator receiving instructions through an audio messaging system and then entering parameters from those instructions into a convenient data entry page on a display device on the vehicle. For purposes of explanation, the subject matter is primarily described herein in the context of aircraft operations; however, the subject matter described herein is not necessarily limited to aircraft or avionics environments, and in alternative implementations, may be implemented in an equivalent manner for ground operations, marine operations, space operations, or otherwise in the context of other types of vehicles and travel spaces.

The present system and methods disclose a digital data entry page for display on a display device on a vehicle such as an aircraft, and in this case, may be referred to as an aviator's scratchpad or notepad. The disclosed data entry page is a place-coded visual or graphic notepad provided to the pilot as a single entry point for multiple different flight-related parameters provided to the pilot by audio messages, such as by the ATC. The terms pilot, aircrew, crew, co-pilot, driver, user, and so forth, whether singular or plural, are used interchangeably herein.

The data entry page has easily accessible data input fields of various parameters related to typical avionics display page such as a primary flight display (PFD), as one example. The data entry page is referred to as "place-coded" herein since the data entry page is analogous to an avionics display, in one example being the PFD. In other words, the data entry fields (also referred to as data parameter fields or just data fields herein) on the data entry page are positioned on the data entry page to mimic the typical location of such parameters on the PFD. Examples are provided below.

This arrangement reduces the need for short-term memory resources by providing a method for the pilot to disposition each chiclet (or character string) as the pilot enters parameters from the chiclet and onto the data entry page, thereby reducing a pilot's overall cognitive workload. As a result, the disclosed data entry page supports ATC clearance and fast interrupt reaction time when received from the ATC since the pilot can immediately disposition ATC instructions as they hear them for many different flight parameters. Once the ATC completes a transmission and the pilot has entered the relevant parameters from the transmission onto the data entry page, the data entry page provides a clear visual summary for the pilot to reference while reading back the clearance or other parameters to the ATC to complete a chiclet communication for example.

As another alternative, a data entry page (or scratchpad) system also may transcribe the incoming audio messages for automatic population of the data entry page. In this case, the pilot reviews the parameters related to a single avionics page in a single data entry page. The pilot can then confirm the parameters for use by the avionics systems to fly the aircraft. Thus, when the ATC transmits audio messages over radio to issue commands, instructions, and/or announcements for the aircrew, the input voice commands (or transcribed messages or just transcriptions) may be parsed and analyzed to automatically identify an operational subject or entity directly or indirectly related to a flight or flight plan of the aircraft to identify a type of parameter being communicated and that is specified within the voice command. The operational subject or entity is then used to automatically identify one or more parameters related to the operational subject or entity (referred to herein as being associated with the transcribed message). These parameters then may be automatically placed on the data entry page in the correct data parameter field for confirmation by the pilot.

With this arrangement of manual or automatic data entry of parameters from audio messages such as an ATC, pilots will significantly increase situational awareness to be able to manage flight planning much more efficiently. The present data entry page reduces the cognitive workload of a pilot while complying with ATC instructions because the pilot does not need to remember what their notes refer to after the ATC has completed their instructions. The data entry page also provides the convenience and speed of confirming multiple parameters on a single display page.

Referring to FIG. 1, an example system 100 may be used by a vehicle, such as an aircraft. In an example implementation, the system 100 is at least partially on an aircraft and includes, without limitation, one or more user input devices 102 that may have one or more microphones 104, a display device 106, one or more processors 108, a display system 110, a communications system 112 with a radio 114, a navigation system 116, a flight management system (FMS) 118, one or more other avionics systems 120, an optional transcription data unit 122, a data storage element 124, and a data entry (or scratchpad or notepad) page unit 126.

In example implementations, the display device 106 is an electronic display capable of graphically displaying flight information or other data associated with operation of the aircraft under control of the display system 110 and/or processor 108. In this example, the display device 106 is coupled to the display system 110 and the processor 108, and the processor 108 and the display system 106 are cooperatively configured to display, render, or otherwise convey one or more graphical representations or images associated with operation of the aircraft on the display device 106, and particularly at least a data entry page that shows data entry fields in a layout mimicking, or analogous to, an avionics page, such as a PFD. The user input device 102 is coupled to the processor(s) 108 and may or may not be considered entirely or partially part of display device 106. The user input device 102 and the processor 108 are cooperatively configured to allow a user (e.g., a pilot) to interact with the display device 106 and/or other elements of the system 100, as described in greater detail below. By one form, the display device 106 is or has a graphical user interface, and may include or be communicatively coupled to, the user input device 102. Depending on the implementation, the user input device(s) 102 may be a keypad or keyboard (whether physical or virtual), touchpad, mouse, touch panel (or touchscreen), joystick, knob, line select key and/or another suitable device adapted to receive input from a user. This may include data entry where the screen is touched at a data entry field and the value to be input that field is typed, or vice-versa in an upselect mode. In some example implementations, the user input device 102 includes an audio input device, such as the microphone 104, audio transducer, audio sensor, or the like, which is adapted to allow a user to provide audio input to the system 100 in a "hands free" manner using speech recognition.

The processor 108 is at least one processor formed by processor circuitry and includes the hardware, software, and/or firmware components configured to operate any of the units described herein, to facilitate communications and/or interaction between the elements of the system 100, and to perform additional tasks and/or functions to support operation of the system 100, as described in greater detail below. Depending on the implementation, the processor 108 may be a general purpose processor such as a central processing unit (CPU), a content addressable memory, a digital signal processor, an application specific integrated circuit, a field programmable gate array, any suitable programmable logic device, discrete gate or transistor logic, processing core(s), discrete hardware components, or any combination thereof, designed to perform the functions described herein. The processor 108 may also be implemented as a combination of computing devices, e.g., a plurality of processing cores, a combination of a digital signal processor and a microprocessor, a plurality of microprocessors, one or more microprocessors in conjunction with a digital signal processor core, a System on a Chip (SoC), or any other such suitable configuration or combination. In practice, the processor 108 includes processing logic that may be configured to perform the functions, techniques, and processing tasks associated with the operation of the system 100, as described in greater detail below. Furthermore, the steps of a method or algorithm described in connection with the implementations disclosed herein may be embodied directly in hardware, in firmware, in a software module (or unit) executed by the processor 108, or in any practical combination thereof. For example, in one or more implementations, the processor 108 includes or otherwise accesses a data storage element (or memory), which may be realized as any sort of non-transitory short or long term storage media capable of storing programming instructions for execution by the processor 108. The code or other computer-executable programming instructions, when read and executed by the processor 108 (or computing device), cause the processor 108 to support or otherwise perform certain tasks, operations, functions, and/or processes described herein.

The display system 110 is the hardware, software, and/or firmware components configured to control the display and/or rendering of the data entry page described herein, one or more navigational maps, and/or other displays pertaining to operation of the aircraft and/or onboard systems 112, 116, 118, 120, and 122 on the display device 106. In this regard, the display system 110 may access or include one or more databases suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 106.

In the illustrated implementation, the aircraft system 100 includes a data storage element 124, which contains aircraft procedure information (or instrument procedure information) for a plurality of airports and maintains association between the aircraft procedure information and the corresponding airports. In example implementations, the data storage element 124 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. Depending on the implementation, the data storage element 124 may be physically realized using RAM memory, ROM memory, flash memory, cache, registers, a hard disk, or another suitable data storage medium known in the art or any suitable combination thereof.

In the present example, the processor 108 is coupled to the navigation system 116, which is configured to provide real-time navigational data and/or information regarding operation of the aircraft. The navigation system 116 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 116, as will be appreciated in the art. The navigation system 116 is capable of obtaining and/or determining the instantaneous position of the aircraft, that is, the current (or instantaneous) location of the aircraft (e.g., the current latitude and longitude) and the current (or instantaneous) altitude or above ground level for the aircraft. The navigation system 116 is also capable of obtaining or otherwise determining the heading of the aircraft. In the illustrated implementation, the processor 108 is also coupled to the communications system 112, which is configured to support communications to and/or from the aircraft. For example, the communications system 112 may support communications between the aircraft and air traffic control or another suitable command center or ground location. Thus, the communications system 112 may be realized using a radio communication system or device (or unit) 114 and/or another suitable data link system. The communications system(s) 112 is, has, or communicates with the avionics systems 116, 118, 120 and transcription data unit 122 capable of receiving clearance or other types of communications from other external sources, such as, for example, other aircraft, an air traffic controller, or the like. Depending on the implementation, the communications system(s) 112 may include one or more of a very high frequency (VHF) radio communications system, a controller-pilot datalink communications (CPDLC) system, an aeronautical operational control (AOC) communications system, an aircraft communications addressing and reporting system (ACARS), and/or the like. In the case of datalinks, audio messages may be pre-transcribed into digital messages that are then transmitted to the avionics systems 116, 118, 120 on the aircraft via the communications system 112.

The audio messages also may be converted to digital formats and then communicated to the aircraft in those digital formats, such as an audio wav file for example, rather than the direct audio signaling by radio, and which also may be provided from the communications system 112 directly to avionics systems 116, 118, 120 that transcribe the messages for display to the pilot. This may include avionics systems that receive messages from automatic terminal information service (ATIS), controller pilot data link communications (CPDLC), and aircraft communications addressing and reporting system (ACARS) as some examples. The FMS unit 118 as well as other avionics systems 116 and 120 including applications on an EFB and others receive the digital messages signals in an expected audio signal format that can be transcribed and/or decoded into text. Thus, the transcription data unit 122, or parts thereof, may be considered to be part of any one or more of these avionics systems.

In example implementations, the processor 108 is also coupled to the FMS 118, which is coupled to the navigation system 116, the communications system 112, the data entry page unit 126, the transcription data unit 122 if provided, and one or more additional avionics systems 120 to support navigation, flight planning, and other aircraft control functions, as well as to provide real-time data and/or information regarding the operational status of the aircraft to the processor 108. The system 100 and/or aircraft may include numerous avionics systems for obtaining and/or providing real-time flight-related information that may be displayed on avionics displays on the display device 106 or otherwise provided to a user (e.g., a pilot). For example, practical implementations of the system 100 and/or aircraft will likely include one or more of the following avionics systems suitably configured to support operation of the aircraft: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag (EFB) and/or another suitable avionics system.

The system 100 also may have the optional transcription data unit 122 to manage the display of parameters on the data entry page while receiving updates and entries of parameters from audio messages. The transcription data unit 122 may be operated by processor 108 and may be communicatively coupled to the other units of system 100 as desired.

Figure 3B:
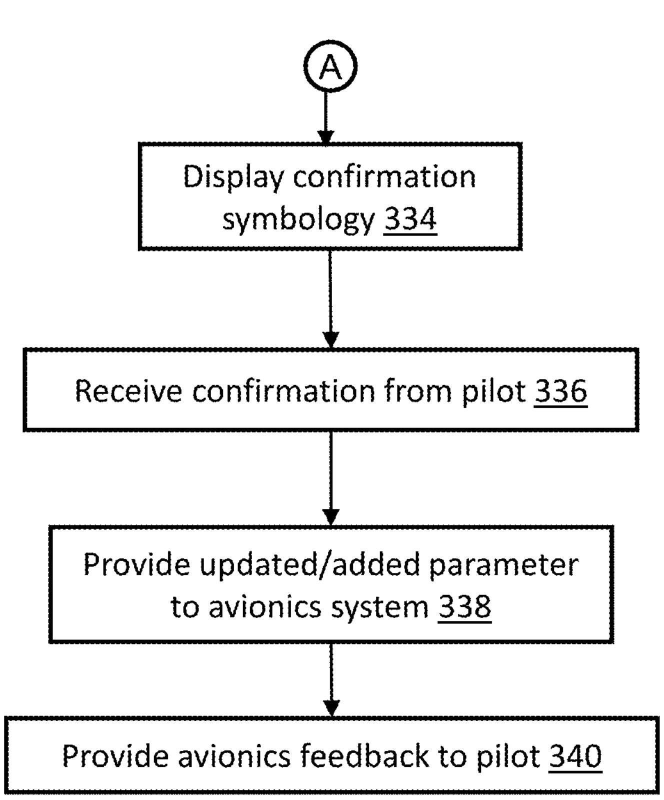

The system 100 also may have the data entry page unit 126 to receive parameters from the pilot, from the transcription data unit 122, if provided, and other avionics systems 120, 118, 116, as well as to manage the display of parameters. The data entry page unit 126 may be operated by processor 108 and may be communicatively coupled to the other units of system 100 as desired. Other details of the data entry page unit 126 and the transcription page unit 122 are provided on FIG. 2, and the operation of these units is provided with process 300 (FIGS. 3A-3B).

It should be understood that FIG. 1 is a simplified representation of the system 100 for purposes of explanation and ease of description, and FIG. 1 is not intended to limit the application or scope of the subject matter described herein in any way. It should be appreciated that any of the systems, units, and devices of system 100 may be entirely onboard the aircraft or partially onboard and remote from the aircraft. By one form, at least the display device 106 is entirely onboard. Those parts of systems, modules, and units of system 100 external to the aircraft may be communicatively coupled to the remaining elements or parts of the system 100 on the aircraft (e.g., via a data link and/or communications system 112). Similarly, in some implementations, the data storage element 124 may be located externally to the aircraft and communicatively coupled to the processor 108 via a data link and/or communications system 112. Furthermore, practical implementations of the system 100 and/or aircraft will include numerous other devices and components for providing additional functions and features, as will be appreciated in the art. In this regard, it will be appreciated that although FIG. 1 shows a single display device 106, in practice, additional display devices may be present onboard the aircraft. Additionally, it should be noted that in other implementations, features and/or functionality of processor 108 described herein can be implemented by or otherwise integrated with the features and/or functionality provided by the FMS 118. In other words, some implementations may integrate the processor 108 with the FMS 118. In yet other implementations, various aspects of the subject matter described herein may be implemented by or at an electronic flight bag (EFB) or similar mobile electronic device that is communicatively coupled to the processor 108 and/or the FMS 118 (or has the processor 108). Thus, the display device 106 may be a mobile device that displays a transcription page as described herein at least while the display device 106 is aboard the aircraft.

Figure 2:
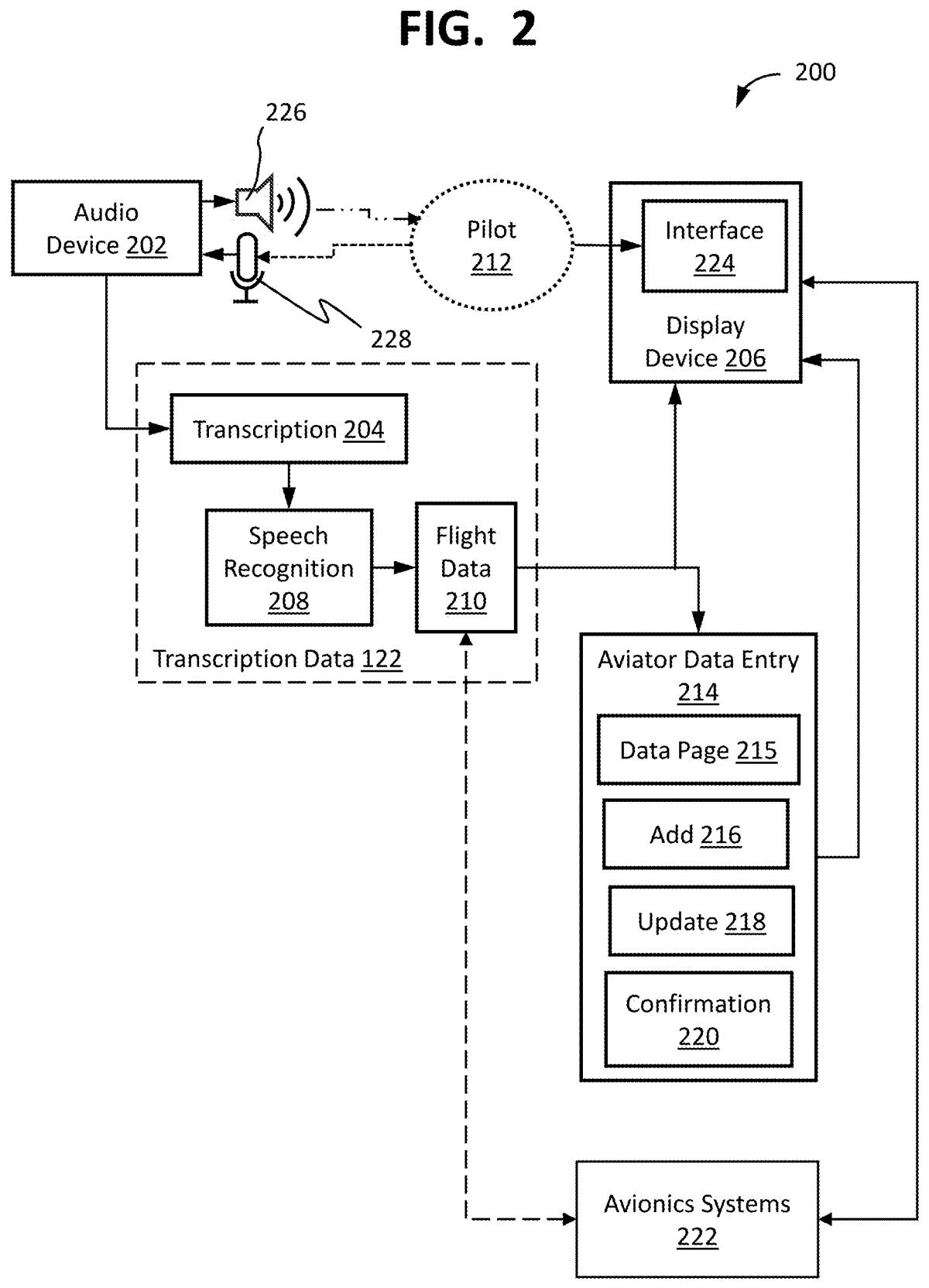

Referring to FIG. 2, a data entry page unit or system 200, similar or the same as data entry page unit 126, receives vehicle or flight-related parameters from the pilot or optionally automatically by use of the optional transcription data unit 122 or other avionics systems 222.

In one or more example implementations, the data entry page system or unit 200 may be implemented or otherwise provided entirely onboard a vehicle, such as on an aircraft. However, in alternative implementations, the data entry page unit 200 may be at least partially implemented independent of any aircraft or vehicle, except for a display device on the vehicle that communicates remotely with other units of the data entry page unit 200 and shows the data entry page on the aircraft or vehicle. The example data entry page unit 200 here includes an audio device 202 with one or more speakers 226 and one or more microphones 228 (such as microphones 104 (FIG. 1)), an aviator data entry unit 214, a display device 206, and one or more avionics systems 222 the same or similar to avionics systems 116, 118, and 120. The display device 206 may have an interface 224 and display system 110 (FIG. 1). The aviator data entry unit 214 may have a data page unit 215, an add unit 216, an update unit 218, and a confirmation unit 220. The transcription data unit 122, when present, may have a transcription unit 204, a speech recognition unit 208, and a flight data unit 210. A pilot or vehicle user 212 hears audio messages from the speakers 226 and may speak an audio message into the microphones 228, while entering parameters into interface 224. Thus, by one form, the audio capture device 202 may include any sort of microphone, audio transducer, audio sensor, or the like capable of receiving voice or speech input. In one or more implementations, the audio capture device 202 may have the microphones 228 (or 104) onboard the aircraft to receive voice or speech annunciated by a pilot or other crewmember onboard the aircraft.

One or more of these sub-units of the data entry page unit 200 and/or transcription data unit 122 may be considered separate from the data entry page unit 200, where the data entry page unit 200 is alternatively formed of at least the aviator data entry unit 214, while the other units mentioned may operate independently.

The output of the data entry page unit 200 is coupled to one or more of the avionics systems 222 to provide a parameter that may be part of (1) control signals or other indicia of a recognized control command or (2) user input to the desired destination system 222 (e.g., via an avionics bus or other communications medium) for implementation, display, or manual or automatic execution of a flight plan as one example.

The data entry page unit 200 is operated by the processor 108. Specifically, the audio device 202 includes at least the speakers 226 and communications system(s) 112 (FIG. 1) to receive or otherwise obtain clearance, interrupts, and other types of communications. The audio device 202 also may have the radio 114 of the communications system 112 to receive messages from various aircraft entities such as clearance messages from the ATC as one example. By other examples, an avionics audio message may be received from Automatic Terminal Information Service (ATIS), Terminal Weather Information for Pilots (TWIP), and Airline Operational Control (AOC). In some implementations, the messages from the radio 114 are emitted from speakers 226, whether loudspeakers or headphones worn by a pilot.

When the pilot conducts a conversation back and forth with the entity, such as with a chiclet, the pilot often identifies the parameter in the audio message, and repeats or speaks the parameter, which is captured by the microphones 228 and transmitted back by the audio device 202 and back to the ATC or other entity. Then, instead of writing the parameter, the pilot enters the parameter into the data entry page using the interface 224.

The interface 224 may be a graphical user interface (GUI) of the display device 206 to receive pilot activation of the data entry page unit 200, activate a specific parameter field, and receive parameter values to place in a parameter field. The pilot may enter parameter values or text by hardware, virtual keypad or keyboard, touchscreen keypad or keyboard, mouse and virtual keypad or keyboard, and so forth forming at least part of the interface 224 to enter or update parameters directly on the data entry page.

Specifically, upon hearing an audio message from speakers 226, the pilot 212 may enter parameters heard in the audio message into a data entry page displayed by the data page unit 215 and shown on display device 206. The pilot 212 uses the interface 224 to enter the parameter onto the data entry page. As other alternative implementations, the system 200 may transcribe the audio message or receive transcription of the audio message, and enter transcribed parameters into the data entry page for updating or confirmation by the pilot. In this case, the audio message is analyzed by the transcription unit 204 to divide the message into phoneme, words, or phrases, and then the speech recognition unit 208 recognizes the words, while lastly, the flight data unit 210 identifies vehicle or flight-related parameters to be inserted onto the data entry page on the display device 206. Otherwise, the FMS 118 and/or other avionics systems 120, or here 222, may initially populate the data entry page for updating and confirmation by the pilot. The details of the operation of system 200 are provide with process 300.

Referring to FIGS. 3A-3B, a process 300 of pilot data entry for audio messages on an aircraft is described according to at least one of the implementations herein. The process 300 includes operations 302 to 342, generally numbered evenly. Systems, device, modules, units, and display pages of any of FIGS. 1-2 and 4-7 may be referred to for process 300 where relevant.

Process 300 may include "receive audio message" 302. For example, a pilot may tune a radio of a communications unit to receive audio messages from, or associated with, a certain entity, such as the ATC, ATIS, AOC, CPDLC, ACARS, Terminal Weather Information for Pilots (TWIP), and so forth. The messages from an ATC for example, may be clearance messages that indicate many different flight-related parameters to be used such as heading, altitude, speed, and so forth as mentioned above.

Process 300 may include "activate data entry page" 303, and this may be performed by the aviator data entry unit 214 in several different ways. First, the data entry page may be automatically activated upon any of the avionics systems on the aircraft being activated, and particularly the FMS or other flight plan system. This may be for an "always on" mode. Second, the activation may include displaying a data entry page upon receiving an audio message over the radio or a transcription of the radio message. Otherwise, a virtual activator on a display device or a physical activator, such as with a button or switch, may be provided anywhere convenient in a cockpit or mobile device, and that is triggered by a pilot or user of the aircraft or vehicle. Thus, as mentioned, the display device 206 showing the data entry page may be on the cockpit instrument panel or vehicle dashboard, mounted within a cockpit, or may be on a mobile device that can be carried into a cockpit such as on an EFB.

When such activation is virtual, the activator may be on a convenient avionics page, such as one or more FMS pages or other virtual location. In this regard, a separate activation page may be provided as well, and may have a menu, or separate menu page, for selecting a type of data entry page when multiple types of data entry pages are available. By one optional form, there may be multiple data entry pages that each mimic a different avionics page, such as a PFD and a horizontal situation display (HSD), as one example. In this case, process 300 may include "receive data entry page selection" 304, where the pilot selects which type or layout of avionics page is to be displayed on a data entry page to be used.

The process 300 then may include "display data entry page" 306, and this is managed by the data page unit 215 providing image data to show the data entry page on a screen of the display device 206. By one form, the primary purpose of the data entry page is to have a single convenient location to enter and save parameters received from the audio messages (or other sources of the pilot). In this case, the data entry page is not used directly to operate the vehicle or aircraft. The input or parameters placed on data entry page are in turn provided to the avionics systems 222 to place the data on the corresponding avionics pages that are viewed to operate the aircraft or vehicle. Thus, in one form, the data entry page is free of movable situational graphics that change with the motion of the aircraft. For example, the data entry page may have an outline of an altitude tape, but the graphics for the outline are not operational and do not scroll as on the real PFD of the aircraft.

Figure 4:
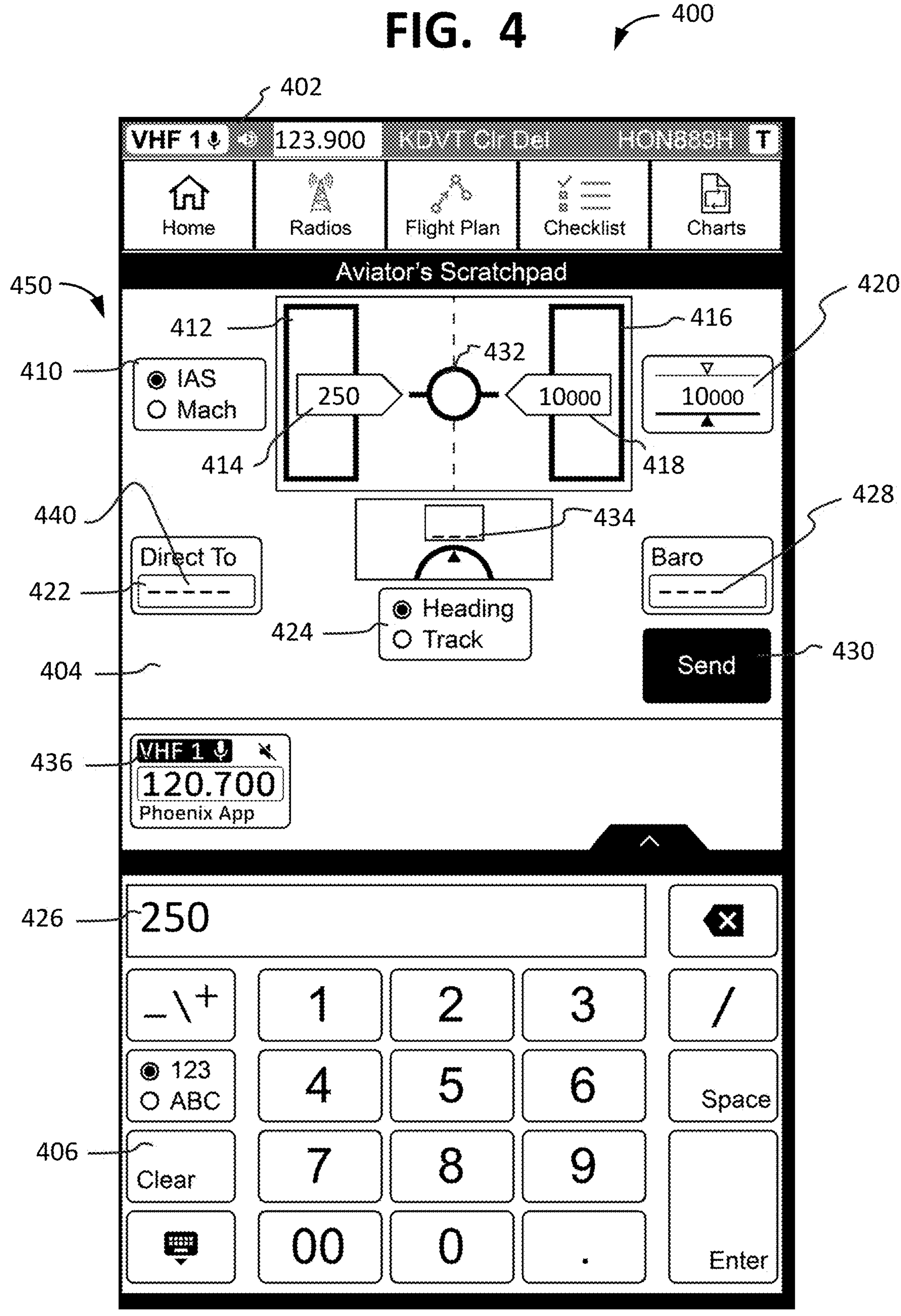
FIG. 4 is a schematic diagram of an example data entry page shown on a display device according to at least one of the implementations herein.

Referring to FIG. 4 as one example, process 300 may include "display parameter fields in layout mimicking avionics display" 308. Here, a screen of a display device 400 shows a data entry page 402. It may have a number of tabs as shown to select a particular display page, and one of those tabs may have an activator button (not shown) to then show the data entry page 402 now shown here. By the present example, the data entry page 402 may have one or more avionics page layout portions, here being one layout portion 404, and a virtual keypad or keyboard portion 406 for a user to enter data into input or data parameter fields on the layout portion 404.

Figure 5:
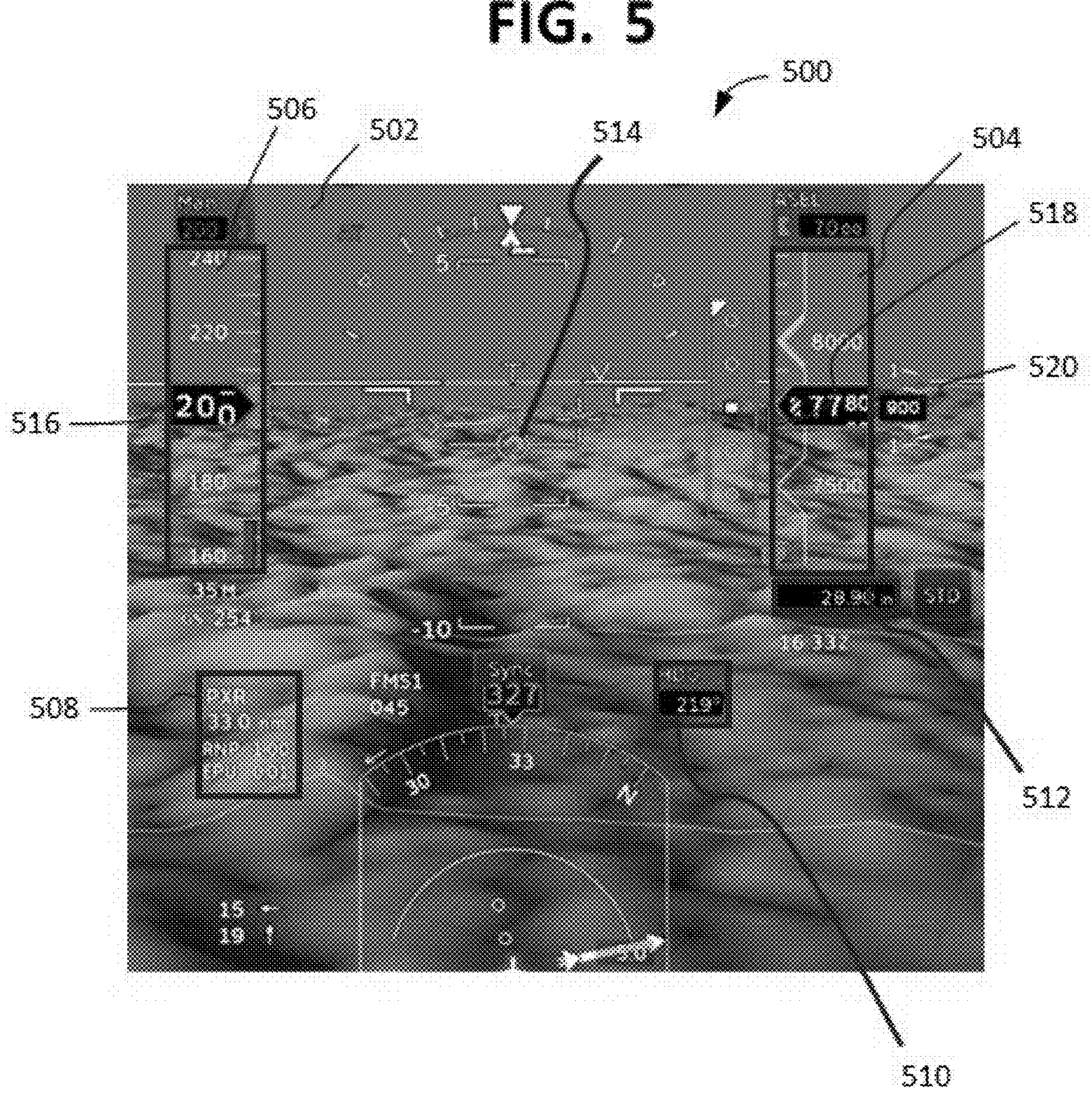
FIG. 5 is a schematic diagram of an example avionics display according to at least one of the implementations herein.

Referring to FIG. 5 for an example comparison, an avionics display 500 is a PFD page (or just PFD) 502 with a speed tape 506 generally near an upper left corner of the PFD 502 compared to other corners, and has a current speed indicator 516 (showing about 200) on the tape 506. Similarly, an altitude tape 504, a current altitude indicator 518 (showing 7780), and altitude restriction 520 (showing 900) is generally near an upper right corner of the PFD 502. Likewise, 'direct to' waypoint data ("PHX" in this example) (and/or other direct to data) is generally located near a lower left corner on the PFD 502, while a heading indicator (labeled HDG and showing 219°) is generally centrally (left to right) located while being lower than the tapes 504 and 506. A barometer pressure indicator 512 (showing 28.90 in) is generally below the altitude tape toward the right side of the PFD 502. A central altitude indicator (or pitch and roll horizontal reference lines (representing wings) and circle (representing the fuselage) 514 is between the tapes 504 and 506. This results in the known "T-PFD" display of primary flight information.

Referring again to FIG. 4, the data entry page 402 has a similar layout 450 to the real PFD 502 to assist a pilot's cognitive layout of incoming vehicle or aircraft parameters from the audio message to be used on the flight deck of the aircraft. In other words, the layout 450 of the data input widgets or data parameter fields 440 matches (or represents, imitates, mimics, analogizes, or copies) the layout of the active values in the real PFD 502. Thus, the incoming parameter can be placed on the data entry page 402 at the imitation location corresponding to where that parameter will be displayed and used on the real PFD 502. For example, the layout portion 404 of the PFD data entry page 402 has a layout 450 with mimicked (or imitation) elements and locations for a speed tape, current speed, an altitude tape, current altitude, an altitude restriction, direct to data, a heading, and barometer pressure reading on the data entry page. The layout of more or less, or different, vehicle or aircraft parameter fields may be used instead. In this particular example, the data entry page mimics the T-PDF layout of the PFD 502. Specifically, an upper left corner area of the data entry page 402 has an imitation speed tape or tape outline 412 with a speed parameter (input) field 414 that imitates the location of the current speed indicator 516. An upper right corner area of the data entry page 402 may have an imitation altitude tape or tape outline 416, an altitude parameter (input) field 418 that imitates the location of the current altitude indicator 518, and an altitude restriction parameter input field (or just altitude constraint field) 420 that imitates the location of the real altitude restriction indicator 520.

The data entry page 402 also has a 'direct to' input parameter field 422 imitating the real direct to parameter location 508 relative to the location of the speed settings and heading location. Also, a heading input field 434 imitates the location of the central and lower real heading location 510, and a barometer pressure input field 428 imitates the location of the real barometer pressure reading location 512 closer to the lower right corner of the layout of real PFD 502 and below the altitude tape 416. The altitude constraint field 420 may be placed between upper and lower bars to permit the pilot to set a direction (minimum or maximum) constraint by tapping or otherwise selecting one of the bars for the altitude constraint.

Otherwise, the layout portion 404 may have a circle and horizontal lines as an imitation altitude indicator 432, as with altitude indicator 514 that has horizontal reference lines to imitate wings of the aircraft, and to better represent the T-PFD layout, but by this imitation form, has no other purpose and does not move (and the background near the altitude indicator 432 does not move either).

By other features, process 300 may include "provide unit alternatives" 310. This refers to generally between alternatives among the same general type of parameter. Thus, in the case of specific units, an altitude unit toggle (or other selector) 410 may be provided with buttons for a pilot to select between Mach or indicated air speed (IAS) in knots. In the case of a general parameter type, a general heading may have a toggle (or other selector) 424 to select between specific heading (the orientation of the aircraft) and track (the direction being followed according to a flight plan).

In addition, a "send" (or confirm or submit) button, control, or activator 430 may be provided to provide the parameters to the avionics systems 222 to control changes to active aircraft flight guidance targets for any of the parameters input into the data entry page 402.

The data entry page (or scratchpad) 402 also may provide other widgets, such as a radio widget 436 for the flight crew that shows data to the flight crew and that may or may not affect active flight controls.

The keypad portion 406 of the data entry page 402 may have a 10-key number pad in this example and may be open when the data entry page 402 is activated to allow for quick inputs by the flight crew. In one form, no "extra" touches are needed to open the keypad. By one form, the keypad portion 406 may have a keypad output display or field 426.

Each input parameter field (or just parameter field) here being fields 414, 418, 420, 422, 424, and 428 collectively referred to as layout (or parameter or input) fields 440, each may be provided as an empty parameter field 440 that has not received the parameter value or text yet. The fields 440 may be completely empty (or blank that is the same or a different color than a background color), or have some other typographical characters reserving digit spaces, such as the underscores shown here. Thus, while the empty parameter fields 440 are shown as a window, block, or box, it may be shown as a completely empty space over or between text of the data entry page 402, or an empty space over a line, or a highlighted space of a different color than a background color except with no text, and so forth. Otherwise, the empty parameter field may have non-parameter text or values that do not form the parameter itself. This may be labels or instructions such as "Place Altitude Here," and so forth, and that can be customized depending on the type or class of parameter. Thus, the parameter fields are still considered empty as long as it does not have the parameter characters, values, or text that form the parameter itself. Many variations are contemplated.

Thus, the aviator data entry unit 214 has the add unit 216 add or control empty fields to the image data, and the data page unit 215 provides the image data to the display device 206 to show the empty parameter fields 440. As one alternative, this also may include showing indicator features used to show that the empty parameter field is to be filled in by the pilot, and may be the existence of the window around the space itself, or similar or other structures that emphasize the parameter field 440, such as having the parameter field glow or flash, change colors, highlighting, and so forth, or graphics such as arrows for example.

Otherwise, the update unit 218 may have the data entry page show parameter fields already populated with initial parameter values either from the avionics systems 222 or from transcribing the audio message, and before providing the pilot the opportunity to update the input parameter values or confirm those values.

Specifically for the avionics systems 222, process 300 optionally may include "populate data entry page from FMS" 312. For this alternative, and when an initial parameter is already determined by the avionics systems 222 and passed to the flight data unit 210, the parameter is displayed in one of the parameter fields 440. Thus, the flight data unit 210 may determine that avionics systems 116, 118, 120 already have a parameter, such as a parameter related to the current situation of the aircraft, such as speed or altitude for example that does not necessarily need to be changed. The automatically generated parameter may be computed while considering other factors not considered by the audio message, such as weather and/or air space clearance factors, for example. Many examples from many different types of the avionics systems 222 can be used. The values from a transcription are treated separately below.

Specifically here for avionics systems'parameters, such an automatically generated parameter may be obtained or computed by using data from a current flight plan (or current operational context and data) from the FMS 118 such as with an already predicted or previously used altitude clearance-based parameter for some examples. Otherwise, the parameter may be obtained from avionics databases on or off the aircraft, from a review of stored past transcriptions to find parameters already used or already mentioned, and/or from checklists or references of standard operating procedures, to name a few examples. When the flight data unit 210 determines a parameter type of the parameter, it provides the parameter to the data page unit 215 to convert the value into image data for display, or directly provides the parameter value to the display device 206 to convert the parameter value into image data for display.

Process 300 then may include "receive parameter field selection from pilot" 314. Thus, the pilot need only touch the parameter field 440 on the data entry page 402 the pilot wishes to change in one example, and this may activate a parameter entry mode. This may occur before the pilot enters the parameter value in the parameter keypad output field 426 on the keypad portion 406 of the data entry page 402. Otherwise, an upselect mode may be used where the target parameter field 440 enters the parameter value into the keypad field 426 first, and then selects the parameter field 440. The parameter field 440 selection can be performed using the interface for the display device 400 directly when the interface is a touchpad or touch screen on the display device 400 showing the data entry page 402. Otherwise, a mouse or other controller may be used to move a cursor over the parameter field 440, or tabs or arrows on a keyboard may be used to move from one parameter field 440 to another until a desired field 440 is emphasized, by color, highlighting, glow, and so forth, and then selected by hitting a key or cursor mouse, as one example.

By another alternative, an audio message may include an instruction that a parameter value is to be at the pilot's discretion, and where the pilot may decide the specific parameter value to be used for a certain parameter type, such as speed, altitude, and so forth. In this case, the pilot also may use any desired source to find and enter the discretionary parameter value into the data entry page as well.

Process 300 may include "receive parameter value from pilot" 316. This includes the entry of a parameter value in a selected parameter field 440 whether the field is empty and the pilot is adding a new value stated in an the audio message or a discretionary value, or the selected parameter field 440 already has an avionics system (or FMS) parameter value, or a transcribed value, and the pilot is updating the parameter value. This updating may occur after or during playing of an audio message providing the parameter values, but may occur at other times. The parameter value may be entered by using the keypad portion 406 or other virtual or physical keypad or keyboard, or any other suitable entry device, including the use of a mouse or other controller. Thus, the pilot 212 (FIG. 2) enters a parameter value heard in the audio message from the audio device 202 and speakers 226, and enters the parameter value in the parameter field 440 in the interface 224.

In the update case, the pilot is permitted to modify the parameters in the parameter fields 440 before confirming them for example, and modified to different desired values during a parameter entry mode. This may show the replacement of the previous parameters in the parameter field character by character, or may simply erase the previous parameter when the pilot begins typing. By yet another approach, it will be understood that this updating can be performed with a drop-down (or other) menu of multiple, likely alternative potential parameter values displayed at a single parameter field as well. In this case, the pilot also selects which alternative parameter value to use and/or update directly on the data entry page 402.

Otherwise, by another alternative, the pilot can trigger an audio mode, either by an audio mode activator placed in the cockpit, on the display device 206 or 400, or other location. By one example form, an audio mode may be entered by a long press or double click, on the parameter field 440 to be changed and that can be considered equivalent to a push-to-command (PTC) button of voice activated avionics systems. Once activated, the pilot speaks an audio message received by the audio capture device 202, and eventually transcribed for the flight data unit 210. The now transcribed and recognized parameter spoken by the pilot is then placed into the selected parameter field 440 to replace the previous parameter in that parameter field. Once placed, the pilot may confirm the selection by touching the confirmation activator 430 or other action to confirm the transcribed parameter value for example, and to provide the confirmed parameter to the avionics systems 222. In this case, once the pilot activates a parameter field, the captured audio of the pilot's recited parameter value 440 transcribed and received by the flight data unit 210 is expected to have the updated or new parameter for the selected parameter field 440. The flight data unit 210 then may search the pilot's audio message for the parameter value, provides the parameter value to the aviator data entry unit 214 to place in the parameter value in the selected field 440 on the display device 206.

Referring again to FIG. 4 for an example, say an ATC audio message is received at flight 889H with the pilot and aircrew described herein, and states "889H, Cleared to FL100, maintain 250 knots", and to complete the chiclet, the pilot of flight 889H states "cleared to FL100, maintain 250 knots, 889H." Thus, in this example, the pilot touches the speed parameter field 414, and then enters 250 (shown at keypad output field 426) as shown which is copied into the speed parameter field 414. Likewise, the pilot then may press on the altitude parameter field 418 and enter 10000 on the keypad 406 to enter 10,000 at field 418. The 10,000 may be copied to the altitude restriction field 420, and may be updated by the pilot. The pilot may touch the bottom bar below the altitude constraint field 420 to indicate the altitude is a floor (or minimum). The bar then changes its appearance to show it is active. The display and confirmation operations then commence as explained below with operations 318 to 322 and 334 to 340.

After the parameter value(s) is received, process 300 may include "display parameter value at selected parameter field on data entry page" 318, which includes displaying the parameter values entered on the data entry page 402 for example on the display device 206 (or 400). This may include displaying added new values (320) and/or updating values (322). This also may include displaying the parameter values from the avionics systems 222 or FMS 118, as explained above, as well as parameter values transcribed from the audio message, explained in greater detail below. The process then continues with confirming the parameter values displayed on the data entry display in operations 334 to 340 described below.

Figure 6:
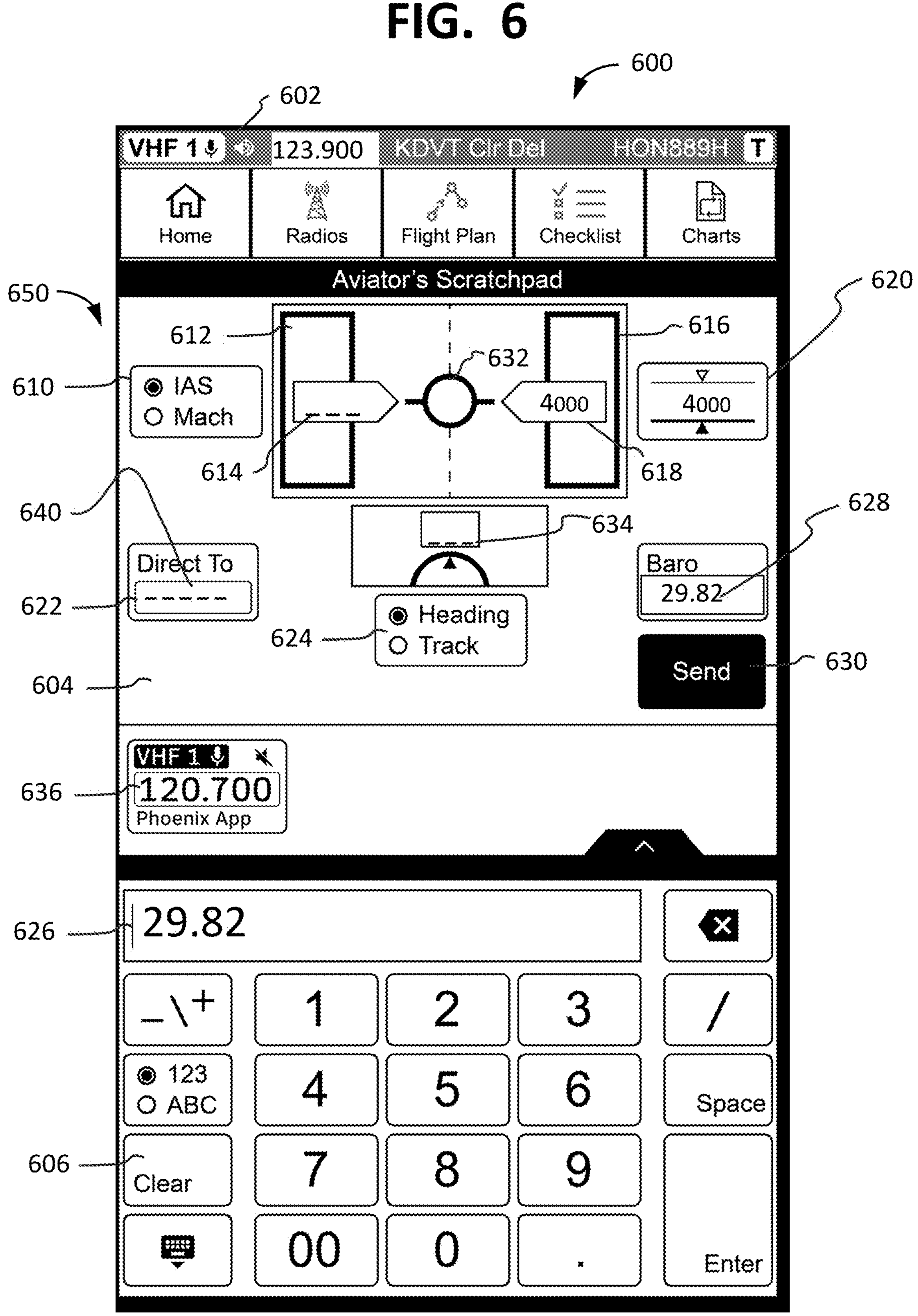
FIG. 6 is a schematic diagram of another example data entry page shown on a display device according to at least one of the implementations herein.

Referring to FIG. 6 as another example of the parameter values displayed on the data entry page, say an audio message is received at flight 889H from an ATC and received by system 200. A data entry page 602 of a display device 600 has the same or similar features as that of data entry page 402 so that the same or similar features are numbered similarly as on data entry page 402 and need not be described again. In this example, the audio message includes "889H, Descend and maintain at least 4000 ft, new QNH, 29.82" where QNH is mean sea level pressure, or in other words, a barometer setting. The pilot responds with "Descend, at or above 4000, QNH 28.82, 889H". During, or upon completing this chiclet (or at any other desired time), the pilot may enter 4000 on the keypad 606, and then perform an upselect by touching or otherwise selecting the altitude parameter field 614 to enter the 4000 in the parameter field 614 as shown. The pilot may also touch the altitude constraint parameter field 620 to enter the 4000 in that field without retyping or reentering the 4000. Then, the pilot may enter a barometer pressure 29.82 in the keypad 606, as shown, and the barometer parameter field 628 is pressed to enter the pressure into the barometer parameter field 628. The confirmation operations then commence as explained below.

First, another branch of process 300 provides for parameter values transcribed from the audio message to be placed on the data entry page. Specifically, by one example approach, when the audio messages are being transcribed, the audio messages either may be provided by datalink where the audio message is pre-transcribed, or the audio message may be transcribed upon receipt by the avionic systems or a transcription data unit 122 (FIG. 2).

By one alternative form, the audio message is transcribed locally aboard the aircraft. In an example implementation here, the transcription data unit 122 continually transcribes audio content of communications received at the aircraft into corresponding textual representations, which, in turn, are then parsed and analyzed to identify the operational subjects and parameters specified within the received sequence of communications pertaining to the aircraft. For example, further natural language processing may be applied to the textual representations of the transcribed communications that were directed to the ownship aircraft by the ATC or another entity (or party), provided by the ownship aircraft to the ATC or another party, broadcasted by the ATC or another party, or otherwise received from the ATIS or another party to identify the operational subject(s) of the communications and any operational parameter value(s) and/or aircraft action (s) associated with the communications. This includes finding a parameter in the transcribed message itself or determining that the transcribed message includes an express or inherent request for a parameter from the pilot (e.g., the pilot has "discretion" as mentioned above).

In this case, process 300 includes "perform speech recognition" 324 to recognize text forming the audio messages, and by using machine learning and/or algorithms. Generally, the audio content of the communications is analyzed, and audio signals are provided to the transcription unit 204 in an expected format. The transcription unit 204 then parses the audio signals into words or otherwise processes voice, speech, or other audio input received by the transcription data unit 122. Thus, the transcription unit 204 performs the front end operations of the transcription. The speech recognition unit 208 then performs language and word recognition to identify the words and numbers. Thereafter, the flight data unit 210 identifies relevant parameter values in the text, which is then provided to the display device 206 and aviator data entry unit 214. Any of the units of such a transcription data unit 122 may use machine learning, neural networks, and other algorithms to perform the transcribing. Thus, the transcription unit 204, the speech recognition unit 208, and the flight data unit 210 may be combined into a single unit or any combination of these may be combined with less than three units when found to be efficient and effective.

Now in more detail, the (automatic) speech recognition (ASR) unit 208 may or may not be separate from the transcription unit 204, where the ASR unit 208 may perform much of the tasks of the transcription unit 204 but also may add language or semantic understanding to interpret and further process the audio messages. Thus, this may include having a speech recognition engine (or voice recognition engine) or other speech-to-text system that processes the received audio signals to perform tasks such as voice detection, feature extraction, acoustic modeling, decoding (by weighted finite state transducers that uses edges and nodes for example), and language recognition or modeling. Acoustic scores from the acoustic model compute probabilities for the different paths (or sequences of nodes and edges) of the decoder, with the highest probability path being recognized as the words, numbers, phrases and so forth forming the transcribed message. Many of these operations are shared by the transcription unit 204 such that the transcription unit 204 and speech recognition unit 208 may be a single unit or module to eliminate duplication of effort when the same algorithms, machine learning, and neural networks are being used for both tasks.

Accordingly, the transcription unit 204 and/or speech recognition unit 208 may share, or both include, various filters, analog-to-digital converters (ADCs), or other audio signal formatting operators. The data storage element 124 (or memory) may store speech recognition vocabularies for use by the transcription unit 204 and/or speech recognition unit 208 in converting audio inputs into transcribed textual representations 'comprehended' by the speech recognition unit 208. The output transcribed and recognized messages (in the form of a textual representation) then may be stored in the data storage element 124, and may be maintained in a certain order as received by the transcription unit 204, This includes both audio messages from the aircrew as well as the external messages. Also, the stored transcription message data may include the source of the transcribed message including the entity and radio frequency.

Process 300 may include "identify flight data parameters" 326, and where this includes the semantic or syntax-understanding level speech recognition that may be performed by the flight data unit 210. The output from the speech recognition unit 208 is provided to the flight data unit 210 to determine whether any flight-related parameters are provided with, or associated with, a transcribed message, and by one form, as well as to determine the full meaning of the transcribed message. For each parameter, the flight data unit 210 may use natural language processing, machine learning, or neural networks (also referred to as artificial intelligence (AI)) techniques to perform further semantic analysis (e.g., parts of speech tagging, position tagging, and/or the like) on the transcribed message to identify the operational objective of the communication, the operational subject(s), operational parameter(s), and/or action(s) contained within the communication based on the syntax of the respective communication. Alternatively, this processing may be managed by the speech recognition unit 208 itself and provides the flight data with indications that certain language likely indicates certain types of flight-related parameters or parameter values.

For example, natural language processing, machine learning, and/or neural network based techniques may be applied to a voice command (which is also in the form of a transcription or textual representation thereof) to determine one or more parameters associated with the transcribed message such as an identifier contained within the transcribed communication (e.g., a flight identifier, call sign, or the like), an operational subject of the communication (e.g., a runway, a taxiway, a waypoint, a heading, a speed, a thrust level, an altitude, a flight level, barometer pressure, or the like), an operational parameter value associated with the operational subject in the transcribed communication (e.g., the runway identifier, taxiway identifier, waypoint identifier, heading angle, altitude value, or the like), and/or an action associated with the communication (e.g., landing, takeoff, pushback, hold, or the like). Also, the flight data unit 210 may analyze new communication entries relative to existing and previously stored communication entries to identify or otherwise determine a conversational context to be assigned to the new clearance communication entry when found to be relevant. The flight data unit 210 (or speech recognition unit 208) may recognize these flight-related commands, operational subject(s), operational parameter(s), and/or action(s) by using a flight command and/or parameter vocabulary to determine probabilities of a particular flight command, parameter, etc. to be implemented.

To accomplish these tasks, operation 326 here may include "parse message" 328, and this refers to the initial operation of breaking down the messages into likely phrases and words for example that are related to flights and may be those matching phrases and words from a flight vocabulary used to classify the type of avionics data that can be involved in the audio messages.

By one form when a flight-related parameter value is found in a transcription, a tag may be provided to identify which audio message originated the parameter value. This includes creating a mark, tag, or otherwise associate the parameter value, as being held in memory, with an association to the corresponding (or associated) transcription. This also may include creating and storing tables for such parameters that lists the parameter value and label or identifier of an associated transcription for each parameter to perform variable or data binding and context management for the transcriptions and parameters.

Operation 326 then may include "identify cockpit task parameters" 330, where the parsed phrases and terms are identified as operational objectives of the communication or audio message, the operational subject(s), and/or action(s), as well as cockpit task parameters. In more detail for one example, and in order to make these determinations and find parameters that are to be entered, updated, and confirmed by the pilot on the data entry page, the flight data unit 210 may obtain information indicative of the current operational context and associated data (e.g., the current conversational context) of one or more onboard systems 116, 118, and 120 (e.g., the current geographic location, the current aircraft altitude, the current aircraft configuration, the current aircraft action, and/or the like) and automatically identifies one or more parameter values for the operational subject of the recognized transcribed message. Thus, the flight data unit 210 may attempt to identify parameter values for the operational subject of the transcribed messages and that could potentially be viable or feasible given the current state of the aircraft (e.g., the current geographic location, altitude, configuration, fuel remaining, etc.), or would otherwise be logical or consistent with the current operational context (e.g., consistent with the flight plan, preceding commands (such as ATC commands) or clearance communications for example, with respect to the aircraft, and/or the like). Thus, in the examples above, the parameters directly in the transcribed messages may be identified such as heading 'FL100' as an altitude in the example audio message for data entry page 402, and speed '250' as a speed in the same message.

In one or more example implementations, the parameter values are also stored or otherwise maintained in association with the received audio messages such as by tags mentioned above, which, in turn, may be used adaptively to train (or retrain) and dynamically update transcription, automatic speech recognition, and flight data models, as described above.

Process 300 then may include "display automatically generated parameter in parameter field" 332. This involves having the flight data unit 210 indicate the parameter type (speed, altitude, etc.) and the transcribed parameter value to the aviator data entry unit 214, or directly in image data to the display device 206, to display the parameter data in the appropriate parameter field 440 or 640. Optionally, the process 300 then may loop to operation 316 to provide the user an opportunity to change or update the automatically generated parameter value.

The displaying of automatically generated parameter values also may apply to the parameter values pre-transcribed and/or generated by the avionics systems 222, including the FMS 118. In these cases as well, the parameter values are displayed on the data entry page, and then the pilot has the opportunity to confirm or change the automatically generated parameter value.

Referring to FIG. 7 as a transcription example implementation, a data entry page 702 of a display device 700 is provided and has the same or similar features of data entry pages 402 and 602 so that the same or similar features are numbered similarly as on data entry pages 402 and 602 and need not be described again. When the system 200 receives an audio message, the data entry page 702 is displayed as mentioned above. In this example, an audio message is received from an ATC (via CPDLC or Voice for example) that states "889H, Fly direct Phoenix VOR, Cross Phoenix VOR at 4000 ft, maintain 200 knots". In this case, the system 200 has transcription capabilities, and processes the audio message automatically by the transcription data unit 122, or other internal or external transcription system. The system 200 then populates the data entry page 702 automatically with the clearance parameter values from the audio message. In this example, the transcribed altitude parameter value 4000 may be automatically placed at the altitude parameter field 718, while the transcribed speed parameter value 200 may be automatically placed at the speed parameter field 714. The pilot then confirms all data was interpreted and entered correctly, and this may be performed by pressing the send or confirm activator 730, as described below in more detail and to activate the displayed parameter values.

It will be appreciated that for any of the data parameter fields mentioned above, a drop down menu of values may be used when a relatively small list of likely or most used parameter values are determined and known. In this case, one of the parameter values may be selected or the pilot may enter a different value into the parameter field. It will be understood that for one option then, the data entry page 402, 602, or 702 also may automatically provide multiple alternative parameter values related to a same single requested or displayed parameter for an audio message. This may occur when different avionics systems indicate different parameters.

As to the confirmation process, process 300 may include "display confirmation symbology" 334, and this includes a confirmation activator 430, 630, or 730 on data entry pages 402, 602, and 702, respectively. The activators 430, 630, or 730 here are labeled "Send" and can be touched or otherwise activated by other actions as mentioned above. The activator 430, 630, or 730 may be arranged to change once all of the other parameter fields are filled or some other event occurs to increase the noticeability of the confirmation activator 430, 630, or 730. This may occur after a certain time period from a time a last parameter field was filled by a pilot, or once any parameter field is filled with a parameter value. Otherwise, the activator 430, 630, or 730 changes may include lighting up, highlighting, or changing the color of the activator 430, 630, or 730, as more examples, but may include other symbols, such as an arrow or additional labeling. A confirmation unit 220 provides the confirmation activators and controls the visibility or emphasis of the activators 430, 630, or 730. By one form, the confirmation activator 430, 630, or 730 is only visible once a parameter value is placed in the parameter field 440. In an alternative, the confirmation activator 430, 630, or 730 is always visible on the display device 206 whether or not the parameter value is there yet.

Process 300 may include "receive confirmation from pilot" 336, and then "provide updated/added parameter to avionics systems" 338 so that the avionics systems can use the parameter, such as to generate a flight plan or add it to an already existing flight plan. The pilot may confirm the displayed parameter values right away when the pilot agrees with the parameter values, and the parameter values may be provided to other avionics systems directly for use and display on other avionic displays of other avionics systems 222, such as a PFD for example. Thus, once a pilot activates the confirmation activator 430, 630, or 730 for at least one parameter value in at least one parameter field on the data entry page, the parameter value is transmitted to the appropriate avionics system 120 or 222 (including FMS 118 or navigation system 116) for use, such as for automatically generating a flight plan by the avionics systems 120 or 222.

Note that as one further option, the pilot may be given the choice as to which avionics systems to provide the new or updated parameter, such as by buttons on the data entry page that may pop open upon selection of the confirmation activator 430, 630, or 730, or another avionics page.

Process 300 may include "provide avionics feedback to pilot" 340, and this may include displaying the parameter on other displays, such as a PFD, HSD, VSD, and so forth. The display of the parameter values on the avionics displays may be part of a flight plan on the other displays. The parameter value then may be provided as a cue on those other avionics cockpit system displays.

It should be appreciated that the process 300 may include any number of additional or alternative operations, and the operations need not be performed in the illustrated order. Also, the operations of process 300 may be performed concurrently, and/or may be incorporated into a more comprehensive procedure or process having additional functionality not described in detail herein. Moreover, one or more of the tasks shown and described in the context of FIGS. 3A-3B can be omitted from a practical implementation of the process 300 as long as the intended overall functionality remains intact.

While the examples herein relate to a T-layout of a PFD, it will be appreciated that any avionics or vehicle page may have a data entry copy page, or the PFD itself may have a different layout that can be copied. Thus for example, a PFD may have an "arc" and/or "radial" configuration instead and that can be copied for a data entry page. Likewise, a Multi-Function Display (MFD) may have a modular layout that includes sections for navigation, weather, and engine data in a grid pattern or dedicated sections for the different functions. A Navigation Display (ND) may have a layout of range rings and other structure that can be copied to a data entry page. An Engine Indication and Crew Alerting System (EICAS) may have engine parameters and alerts in a standardized layout with dedicated sections for each engine and a separate area for warnings that can be copied as well. A Traffic Collision Avoidance System (TCAS) may have a vertical and horizontal representation of aircraft proximity with a standardized format for alerts and advisories that can be copied. A Flight Management System (FMS) page itself may have a recognizable interface layout with common screens showing data for flight planning, performance data, and navigation that can be copied on a data entry page when desired.

Similarly, a Standby Instrument Display may have basic flight data such as airspeed, altitude, and attitude in a simplified format in a layout that can be copied. A Radio Management Panel (RMP) may have a consistent arrangement for tuning frequencies with sections for communication and navigation radios, often using knobs and digital displays that may be copied. An Autopilot Control Panel may have a layout displays for mode selection, altitude settings, and speed control that may be copied on a data entry page. A Weather Radar Display may have a standard layout to show precipitation levels, storm cells, and terrain, with color-coded graphics that may be copied to a data entry display. A Flight Data Recorder (FDR) Display may have a layout for reviewing flight data typically for displaying time-series data, engine parameters, and flight path that may be copied to a data entry display. Finally, a Cockpit Voice Recorder (CVR) Interface for accessing recorded audio usually follows a consistent layout that may be copied for a data entry page or display.

For the sake of brevity, conventional techniques related to user interfaces, speech recognition, avionics systems, including determination of parameters associated with audio messages and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an implementation of the subject matter.

It should be noted that the terms avionic and avionics are used interchangeably herein to refer to anything related to a flying vehicle.

The subject matter may be described herein in terms of functional and/or logical block, module, or unit components, and with reference to symbolic representations of operations, processing tasks, and functions that may be performed by various computing components or devices. It should be appreciated that the various block components shown in the figures may be realized by any number of hardware components configured to perform the specified functions. For example, an implementation of a system or a component may employ various integrated circuit components, e.g., memory elements, digital signal processing elements, logic elements, look-up tables, or the like, which may perform a variety of functions under the control of one or more microprocessors or other control devices. Furthermore, implementations of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "connected" or "coupled" together. As used herein, unless expressly stated otherwise, "coupled" and "connected" refers to one element/node/feature is directly or indirectly joined to (or directly or indirectly communicates with) another element/node/feature, and not necessarily mechanically. Thus, although the drawings may depict one example arrangement of elements directly connected to one another, additional intervening elements, devices, features, or components may be present in an implementation of the depicted subject matter. In addition, certain terminology may also be used herein for the purpose of reference only, and thus are not intended to be limiting.

The foregoing detailed description is merely example in nature and is not intended to limit the subject matter of the application and uses thereof. Furthermore, there is no intention to be bound by any theory presented in the preceding background, brief summary, or the detailed description.

While at least one example implementation has been presented in the foregoing detailed description, it should be appreciated that a vast number of variations exist. It should also be appreciated that the example implementation or example implementations are only examples, and are not intended to limit the scope, applicability, or configuration of the subject matter in any way. Rather, the foregoing detailed description will provide those skilled in the art with a convenient road map for implementing an example implementation of the subject matter. It should be understood that various changes may be made in the function and arrangement of elements described in an example implementation without departing from the scope of the subject matter as set forth in the appended claims. Accordingly, details of the example implementations or other limitations described above should not be read into the claims absent a clear intention to the contrary.

What is claimed is:

1. A method, comprising:

receiving at least one audio message providing instructions to a user to operate an aircraft;

displaying, by at least one processor, an avionics data entry page on a display device and having multiple data parameter fields to receive one or more avionics parameters of different types from the audio message, wherein the multiple data parameter fields are arranged in a data entry layout that mimics a parameter display layout of an avionics display so that an individual data parameter field at a mimicked location on the avionics data entry page has a related parameter display position on the avionics display; and receiving, by at least one processor, confirmation from the user that at least one of the avionics parameters on the avionics data entry page is correct.

2. The method of claim 1, wherein the avionics display is a primary flight display (PFD).

3. The method of claim 1, wherein at least one of the avionics parameters is entered onto the avionics data entry page by the user.

4. The method of claim 1, comprising automatically inputting, by at least one processor, at least one of the avionics parameters transcribed from the at least one audio message and input onto the avionics data entry page.

5. The method of claim 1, wherein the data entry layout comprises data fields of at least one avionics parameter related to an air traffic control (ATC) instruction, a flight plan, an aircraft position, an aircraft orientation, a take-off, a landing, cruising, or an airspace constraint.

6. The method of claim 1, wherein the data entry layout comprises data fields of altitude, altitude constraint, air speed, direct to location, heading, and barometer positioned relative to each other to mimic the parameter display layout of the same parameter types displayed on the avionics display.

7. The method of claim 1, wherein the data entry layout comprises one or more activators to select alternative units or alternative parameter types for at least one of the data parameter fields.

8. The method of claim 1, wherein the avionics data entry page is dedicated to data entry so that the avionics data entry page is free of movable situational graphics that changes with motion of the aircraft.

9. The method of claim 8, wherein the movable situational graphics comprises movable non-textual graphics.

10. A system, comprising:

memory;

processing circuitry forming at least one processor communicatively coupled to the memory and being arranged to operate by:

receiving at least one audio message providing instructions to a user to operate an aircraft;

displaying an avionics data entry page on a display device and having multiple data parameter fields to receive one or more avionics parameters of different types from the audio message, wherein the multiple data parameter fields are arranged in a data entry layout that mimics a parameter display layout of an avionics display so that an individual data parameter field at a mimicked location on the avionics data entry page has a related parameter display position on the avionics display; and receiving confirmation from the user that at least one of the avionics parameters on the avionics data entry page is correct.

11. The system of claim 10, wherein the data parameter fields are each a graphical user interface to be selected to enter or change an avionics parameter value in the parameter data fields.

12. The aircraft of claim 10, wherein the avionics display is at least one of a (PFD), horizontal situation display (HSD), and vertical situation display (VSD).

13. The system of claim 10, wherein the avionics data entry page mimics a primary flight display and having non-moving imitations of an altitude tape and a speed tape.

14. The system of claim 10, wherein the avionics data entry page has both a fixed graphical representation of the aircraft and a fixed background adjacent the graphical representation.

15. The system of claim 10, comprising a confirmation activator accessible to the user and having a changing appearance that changes when at least one avionic parameter is entered into at least one avionics parameter data field.

16. A non-transitory computer-readable medium having computer-executable instructions stored thereon that, when executed by a computing device, cause the computing device to operate by:

receiving at least one audio message providing instructions to a user to operate an aircraft;

displaying an avionics data entry page on a display device and having multiple data parameter fields to receive one or more avionics parameters of different types from the audio message, wherein the multiple data parameter fields are arranged in a data entry layout that mimics a parameter display layout of an avionics display so that an individual data parameter field at a mimicked location on the avionics data entry page has a related parameter display position on the avionics display; and receiving confirmation from the user that at least one of the avionics parameters on the avionics data entry page is correct.

17. The medium of claim 16, wherein the at least one audio message is from at least one of: an air traffic control (ATC), Automatic Terminal Information Service (ATIS), Terminal Weather Information for Pilots (TWIP), and Airline Operational Control (AOC).

18. The medium of claim 16, wherein the display device is a mobile device that communicates wirelessly with at least one avionics system on the aircraft.

19. The medium of claim 16, wherein the instructions cause the computing device to operate by placing an updated parameter value from the user into at least one of data parameter fields that already has an initial parameter value in at least one of the multiple data parameter fields.

20. The medium of claim 16, wherein the data parameter fields receive avionics parameters related to the aircraft and is at least two of: altitude, vehicle speed, thrust level, climb rate, descent rate, heading, landing instruction, departure instruction, an aircraft location, waypoint location, distance, and time that are also displayed on at least two different avionics displays.

* * * * *